(12) United States Patent
Guckenberger et al.

(10) Patent No.: US 9,901,209 B2
(45) Date of Patent: Feb. 27, 2018

(54) TABLETOP GRILL

(71) Applicant: Spectrum Brands, Inc., Middleton, WI (US)

(72) Inventors: Matthew Arthur Christian Guckenberger, Oconomowoc, WI (US); Kevin Bruce Kinney, Verona, WI (US); Rocky Marvin Van Asten, Madison, WI (US); Jacob Daniel Smith, Madison, WI (US); Victor Tenorio Cavalcanti, Madison, WI (US); Karl Warner Marschke, Madison, WI (US); David William Everett, Verona, WI (US); Byron Seth Sawyer, Middleton, WI (US); Nicole Ann Sorenson, Verona, WI (US)

(73) Assignee: Spectrum Brands, Inc., Middleton, WI (US)

( * ) Notice: Subject to any disclaimer, the term of this patent is extended or adjusted under 35 U.S.C. 154(b) by 701 days.

(21) Appl. No.: 14/291,227

(22) Filed: May 30, 2014

(65) Prior Publication Data

US 2014/0352553 A1 Dec. 4, 2014

Related U.S. Application Data

(60) Provisional application No. 61/829,844, filed on May 31, 2013, provisional application No. 61/834,331, (Continued)

(51) Int. Cl.
*G05D 23/30* (2006.01)
*A47J 37/06* (2006.01)

(52) U.S. Cl.
CPC ....... *A47J 37/0611* (2013.01); *A47J 37/0676* (2013.01); *A47J 37/0688* (2013.01); *A47J 2037/0617* (2013.01)

(58) Field of Classification Search
CPC ................ H05B 1/0213; H05B 1/0208; H05B 2203/014; F02B 3/06; G05D 23/30
(Continued)

(56) References Cited

U.S. PATENT DOCUMENTS 3,848,110 A * 11/1974 Giguere ................... H05B 3/72
219/386
4,178,500 A * 12/1979 Brindopke ........... A47J 37/0611
219/386
(Continued)

FOREIGN PATENT DOCUMENTS

FR 1551844 A 12/1968
FR 2975883 A1 12/2012

OTHER PUBLICATIONS

Extended European Search Report and Opinion, Application No. 14170674.7-1656, dated Oct. 8, 2014; 6 pages.

*Primary Examiner* — Tu B Hoang
*Assistant Examiner* — Thomas Ward
(74) *Attorney, Agent, or Firm* — Kagan Binder, PLLC

(57) ABSTRACT

A tabletop grill generally includes a first grill unit having a first grill plate and a first heating element for heating the first grill plate. The grill further includes a second grill unit positionable relative to the first grill unit. The second grill unit has a second grill plate and a second heating element for heating the second grill plate. The grill is configured to function as a broiler.

14 Claims, 24 Drawing Sheets

Related U.S. Application Data filed on Jun. 12, 2013, provisional application No. 61/896,404, filed on Oct. 28, 2013.

(58) Field of Classification Search
USPC .......... 219/351, 386, 521, 524, 387; 99/374, 99/379, 389
See application file for complete search history.

(56) References Cited

U.S. PATENT DOCUMENTS

| | | | |
|---|---|---|---|
| 6,188,836 B1* | 2/2001 | Glucksman | F24B 7/005 392/373 |
| 7,717,028 B2* | 5/2010 | Serra | A47J 37/0611 99/339 |
| 2002/0096984 A1* | 7/2002 | Konishi | H01K 1/06 313/25 |
| 2005/0132900 A1* | 6/2005 | Cavada | A47J 37/0807 99/389 |
| 2010/0319550 A1* | 12/2010 | Wu | A47J 37/0611 99/380 |
| 2011/0062151 A1 | 3/2011 | Tassan-Mangina et al. | |

* cited by examiner

TABLETOP GRILL

CROSS-REFERENCE TO RELATED APPLICATIONS

This application claims the benefit of U.S. Provisional Application No. 61/829,844 filed on May 31, 2013; U.S. Provisional Application No. 61/834,331 filed on Jun. 12, 2013; and U.S. Provisional Application No. 61/896,404 filed on Oct. 28, 2013, which are incorporated by reference herein in their entirety.

BACKGROUND

The present invention relates generally to heating appliances and, more particularly, to a tabletop grill for use in heating a food product.

Many conventional tabletop grills have an upper housing and a lower housing that are connected together via a hinge in a clamshell-type configuration. A heating element is mounted on each of the housings, and the heating element is configured to heat a grill plate for grilling a food product in contact with the grill plate. However, conventional tabletop grills transfer heat from the heating element to the food product in a less than desirable manner. It would be useful, therefore, to more effectively transfer heat from the heating element to the food product.

SUMMARY

In one embodiment, a tabletop grill generally comprises a first grill unit comprising a first grill plate and a first heating element for heating the first grill plate. The grill further comprises a second grill unit positionable relative to the first grill unit. The second grill unit comprises a second grill plate and a second heating element for heating the second grill plate. The grill is configured to function as a broiler.

In another embodiment, a tabletop grill generally comprises a first grill unit and a second grill unit positionable relative to the first grill unit. The second grill unit comprises a housing defining an interior space, a quartz-type heating element disposed within the interior space of the housing, and a grill plate mounted on the housing to cover the interior space such that the heating element is configured to heat the grill plate.

In yet another embodiment, a tabletop grill generally comprises a first grill unit and a second grill unit positionable relative to the first grill unit. The second grill unit comprises a housing defining an interior space, a grill plate removably mounted on the housing to cover the interior space, and a reflector disposed within the interior space. The reflector comprises an upper surface that defines a trough. The second grill unit also comprises a quartz-type heating element mounted within the interior space in spaced relation to the reflector. The heating element extends along the trough such that energy emitted from the heating element impacts the upper surface of the reflector within the through and is reflected toward the grill plate. The grill further comprises a hinge pivotably connecting the first grill unit to the second grill unit. The hinge is configured to limit the range of pivoting motion of the second grill unit relative to the first grill unit when the grill plate is removed from the housing.

BRIEF DESCRIPTION

Corresponding reference characters indicate corresponding parts throughout the several views of the drawings.

DETAILED DESCRIPTION

Figure 1:
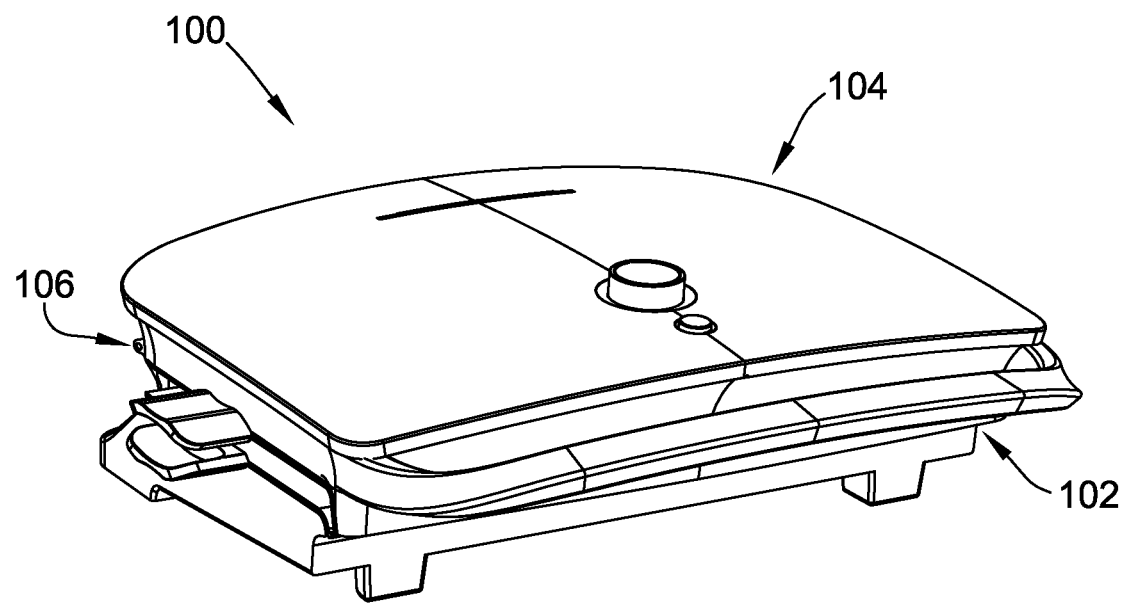
FIG. 1 is a perspective view of one embodiment of a tabletop grill.
Figure 2:
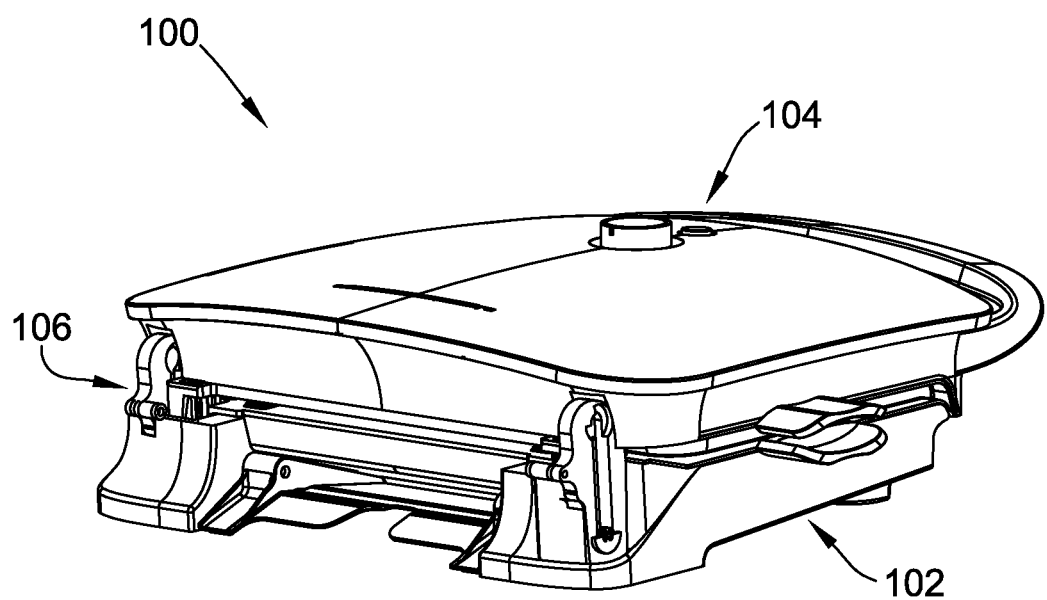
FIG. 2 is another perspective view of the tabletop grill of FIG. 1.

Referring to the drawings, and in particular to FIGS. 1 and 2, a heating appliance (e.g., a tabletop grill according to the illustrated embodiment) is indicated generally by 100. The illustrated grill 100 comprises a bottom grill unit (indicated generally by 102) and a top grill unit (indicated generally by 104) that are connected together via a hinge (indicated generally by 106). As set forth below, the grill 100 is configured for heating a food product in a variety of ways, using at least one of the bottom grill unit 102 and the top grill unit 104.

Figure 3:
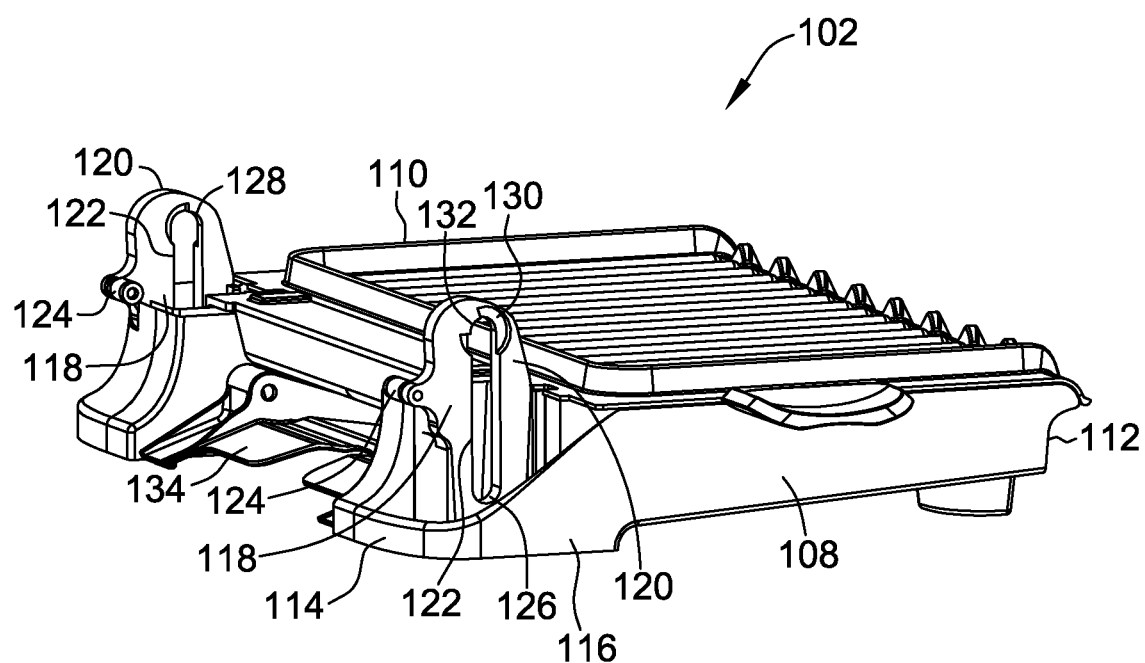
FIG. 3 is a perspective view of a bottom grill unit of the tabletop grill of FIG. 1.

As illustrated in FIG. 3, the bottom grill unit 102 includes a bottom housing 108 and a bottom grill plate 110 mounted on the bottom housing 108. The bottom housing 108 has front 112, a back (or rear) 114, and at least one foot 116 for supporting the grill 100 on a support surface (e.g., a flat tabletop or countertop surface). The back 114 of the bottom housing 108 defines a bottom half 118 of the hinge 106, which includes a pair of bottom leaves 120 that each defines a substantially vertical slot 122. The back 114 of the bottom housing 108 also includes a pair of fulcrum structures 124 each situated rearward of one of the slots 122. In this manner, each fulcrum structure 124 is vertically spaced about midway along its respective slot 122 in relation to the foot 116. Moreover, each slot 122 has a lower end 126, an upper end 128, and a generally C-shaped recess (or counter-depth) 130 circumscribing a portion of the upper end 128 to define a stopper 132. Optionally, the bottom grill unit 102 may further include a pivotable stand 134 configured for selectively elevating the back 114 of the bottom housing 108 to increase the angle of the bottom grill plate 110 relative to the support surface if desired. By elevating the back 114 of the bottom housing 108, grease can be more effectively drained from the bottom grill plate 110 while heating a food product.

Figure 11:
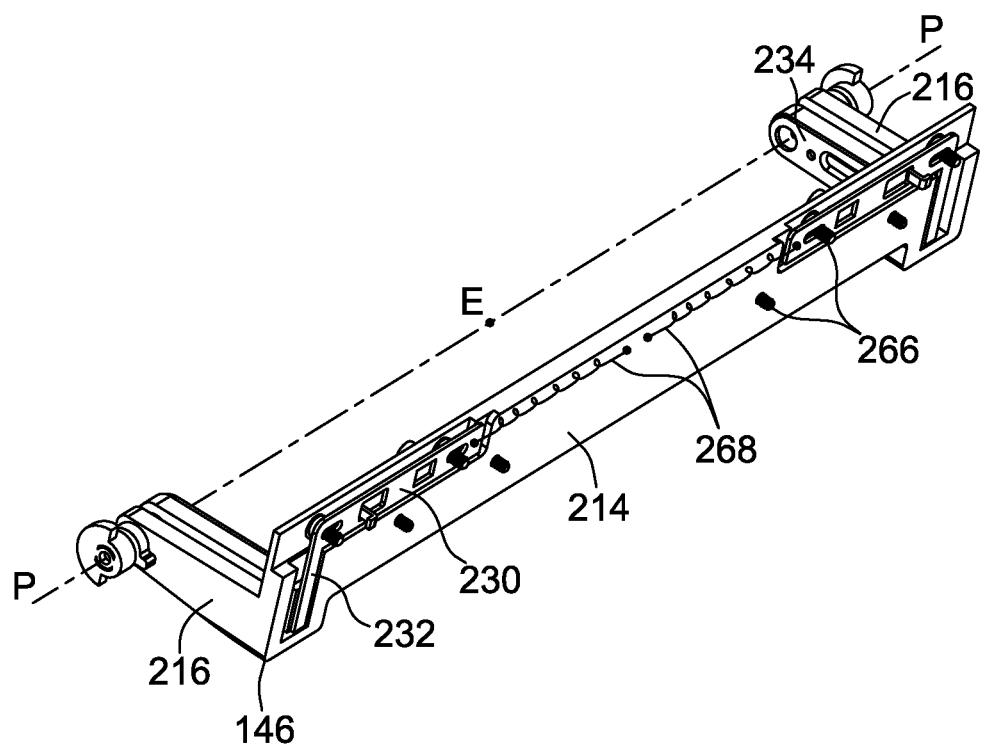
FIG. 11 is another perspective view of the hinge segment of FIG. 10.
Figure 12:
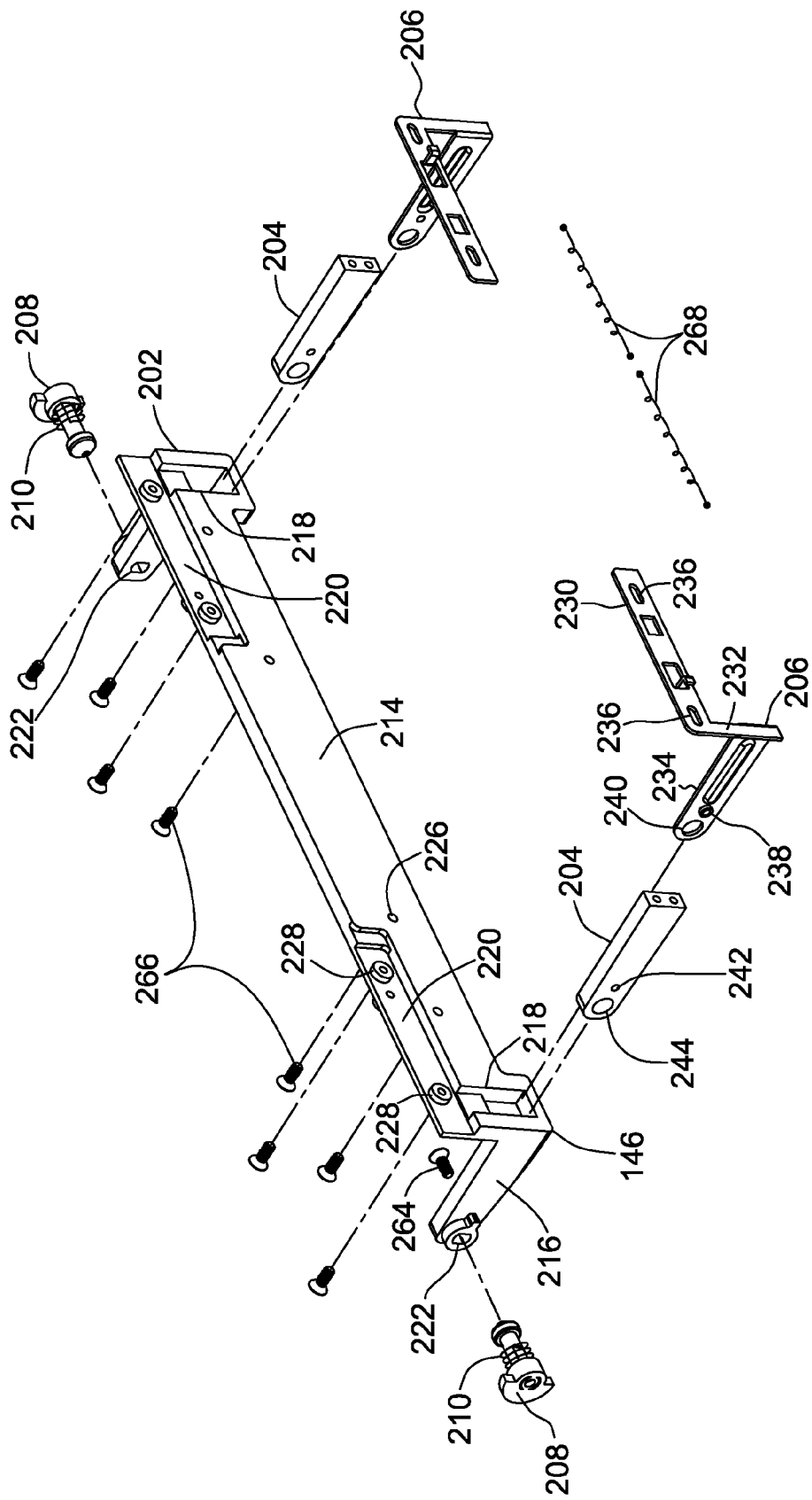
FIG. 12 is an exploded view of the hinge segment of FIG. 10.
Figure 13:
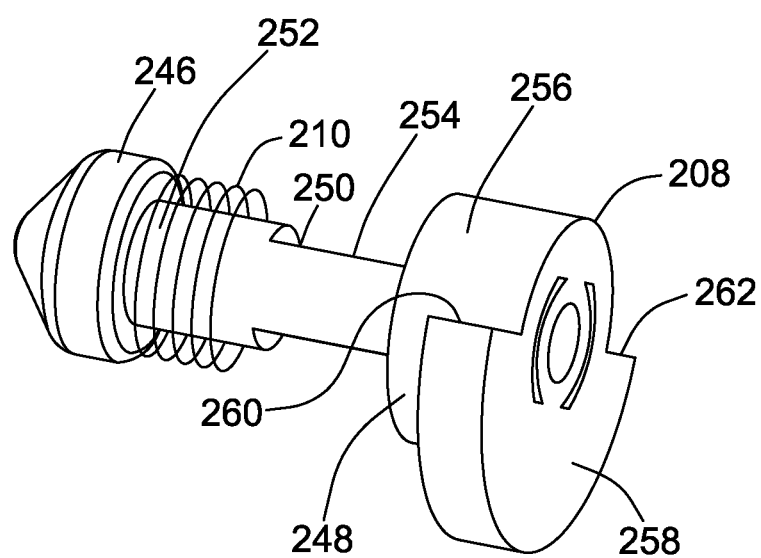
FIG. 13 is a perspective view of a pin of the hinge segment of FIG. 10.

As used herein, the term "vertical" refers to a dimension that is to be oriented perpendicular to the support surface upon which the foot 116 of the grill 100 is to be seated during operation of the grill 100. As such, the term "horizontal" refers to a dimension that is oriented perpendicular to vertical. Additionally, as used herein, the term "grill plate" is not limited to an implement having a ribbed food-contacting surface as shown in the illustrated embodiment but, rather, a grill plate may have any suitable food-contacting surface such as a substantially flat (griddle-type) surface, a grated surface, etc. Moreover, the terms "inner," "inward," "outer," "outward," and any variations thereof are directional modifiers indicating a disposition relative to a center E of a pivot axis P of the hinge 106, as shown in FIG. 11 (e.g., a grill component may be displaced inward by being moved parallel to the axis P toward the center E, and outward by being moved parallel to the axis P away from the center E).

Figure 4:
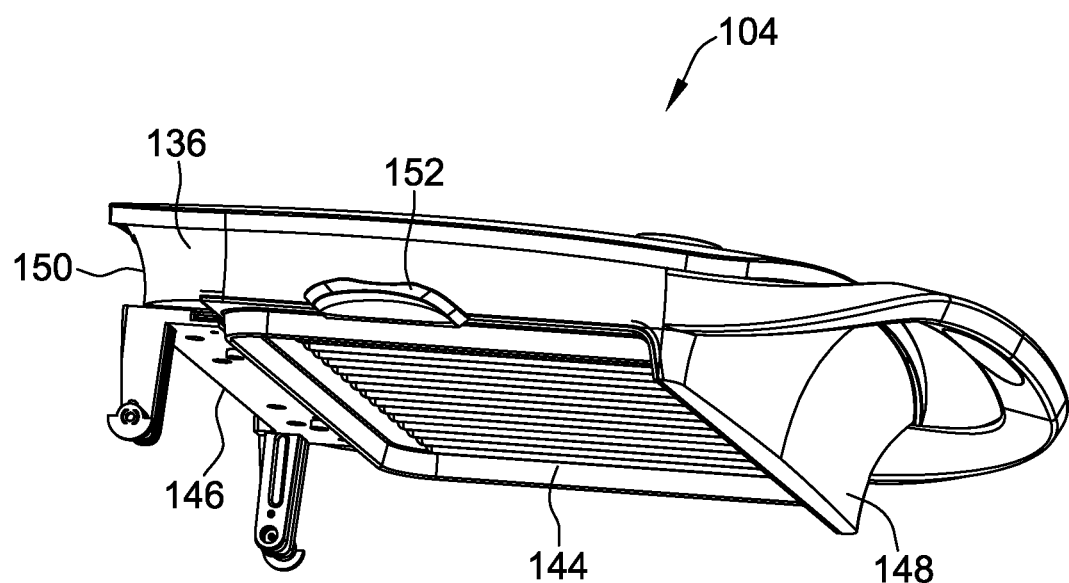
FIG. 4 is a perspective view of a top grill unit of the tabletop grill of FIG. 1.
Figure 5:
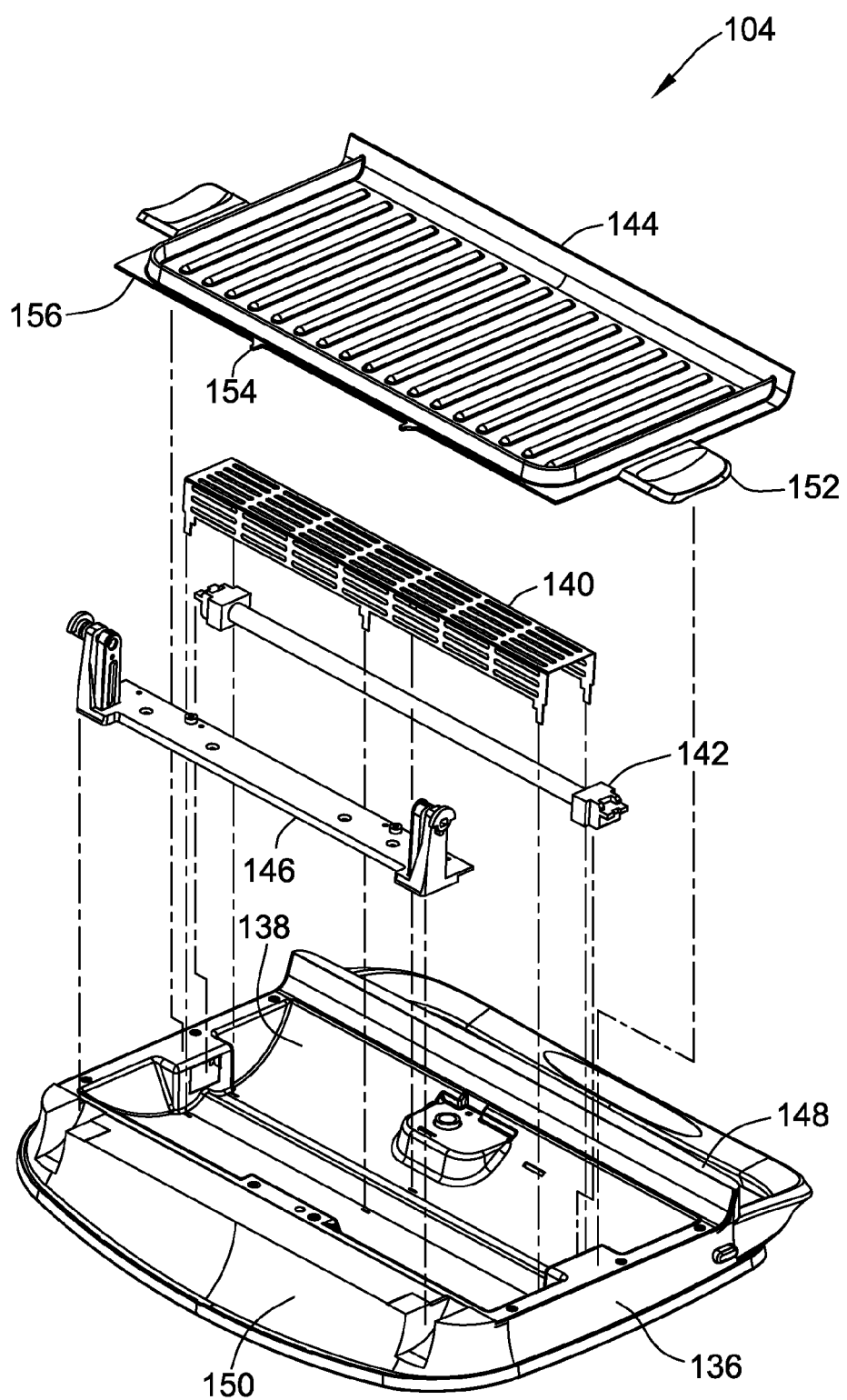
FIG. 5 is an exploded view of the top grill unit of FIG. 4.
Figure 6:
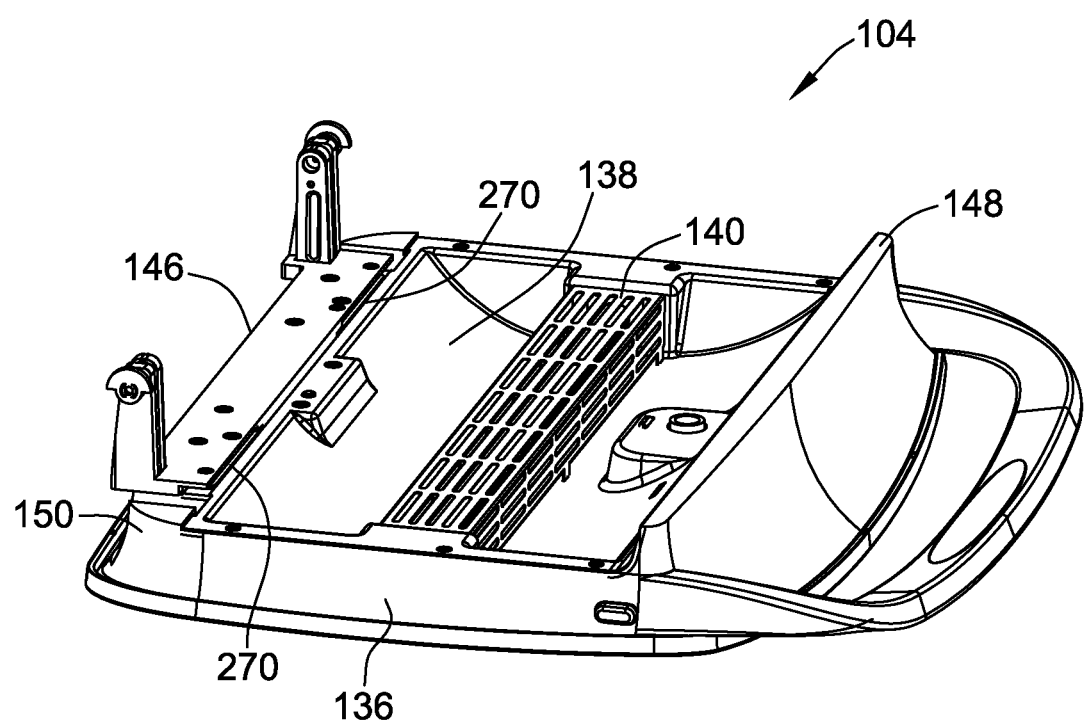
FIG. 6 is a perspective view of the top grill unit of FIG. 4 with its grill plate removed.

Referring now to FIGS. 4-6, the top grill unit 104 includes a top housing 136, a reflector 138 disposed within the top housing 136, and a heating element 142 partially surrounded by, and spaced apart from, the reflector 138. The top grill unit 104 further includes a guard 140 for the heating element 142, a top grill plate 144 mounted on the top housing 136 to cover the heating element 142, and a top half 146 of the hinge 106 for pivotably attaching the top grill unit 104 to the bottom grill unit 102 via the bottom half 118 of the hinge 106. While the reflector 138, the guard 140, and the heating element 142 are described below in terms of the top grill unit 104, it should be noted that the bottom grill unit 102 has the same reflector 138, guard 140, and heating element 142 mounted in the same manner within the bottom housing 108 beneath the bottom grill plate 110.

In the illustrated embodiment, the top housing 136 has a front 148 and a back (or rear) 150. In the same manner as the bottom grill plate 110, the top grill plate 144 has a pair of handles 152 connected thereto, and the handles 152 are suitably configured such that the top grill plate 144 can be removed. For example, it may be desirable to remove the top grill plate 144 from the top housing 136 to perform a broiling function using the grill 100, to clean the top grill plate 144, or to replace the top grill plate 144 with another grill plate. Moreover, the top grill plate 144 has a pair of wedges (or cams) 154 extending from its back side 156 to facilitate operating the hinge 106, as set forth in more detail below. As used herein, the term "broil" refers to heating by exposure to radiant energy such as, for example, infrared radiant energy.

Notably, the illustrated grill 100 is configured as a horizontal grill (i.e., a grill configured to heat a food product with the grill plate(s) 110, 144 oriented substantially parallel to the support surface). However, it is contemplated that the grill 100 may be a vertical grill in other embodiments (i.e., a grill configured to heat a food product with the grill plate(s) 110, 144 oriented substantially perpendicular to the support surface). Alternatively, the grill 100 may be configured to heat a food product with the grill plate(s) 110, 144 oriented in any suitable manner.

Figure 7:
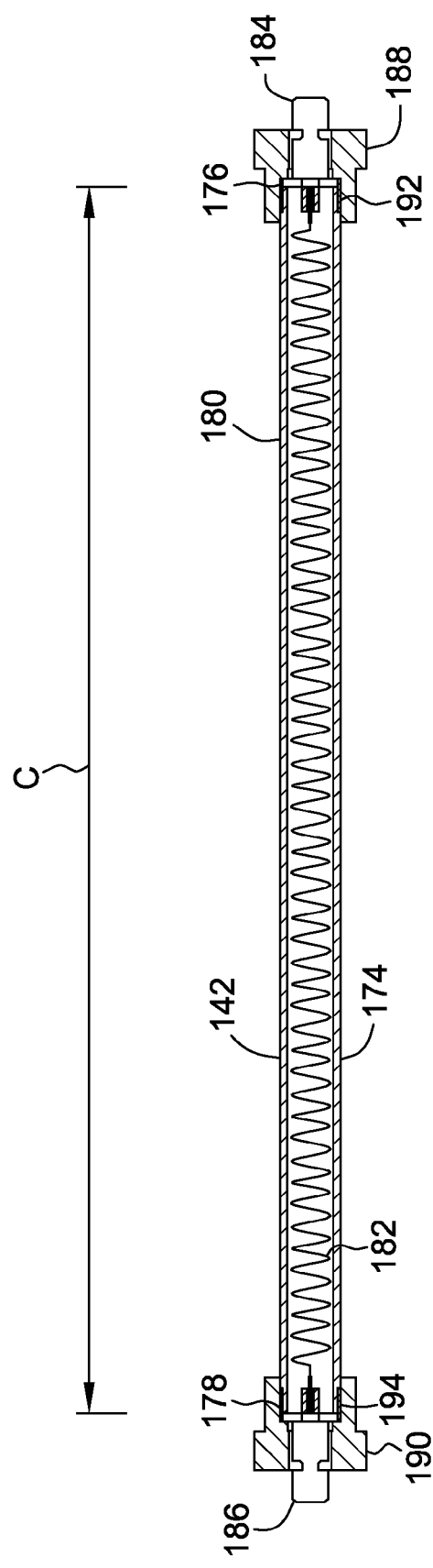
FIG. 7 is a cross-sectional view of a heating element of the top grill unit of FIG. 4.

Referring now to FIG. 7, the illustrated heating element 142 is a quartz-type heating element configured as follows. The heating element 142 includes a substantially linearly extending tube 174 having a first end 176, a second end 178, and a body 180 extending from the first end 176 to the second end 178 such that the tube 174 has a length C. A filament 182 is disposed within and extends along the length C of the tube 174 substantially from the first end 176 of the tube 174 to the second end 178 of the tube 174. A first electrical lead 184 is connected to the filament 182 near the first end 176 of the tube 174, and a second electrical lead 186 is connected to the filament 182 near the second end 178 of the tube 174.

A first end cap 188 is attached to the first end 176 of the tube 174 about the first electrical lead 184 such that the first electrical lead 184 passes through (i.e., is supported within and extends outward from) the first end cap 188. Similarly, a second end cap 190 is attached to the second end 178 of the tube 174 about the second electrical lead 186 such that the second electrical lead 186 passes through (i.e., is supported within and extends outward from) the second end cap 190. In this manner, the first end cap 188 supports the first electrical lead 184, and the second end cap 190 supports the second electrical lead 186. Moreover, the end caps 188, 190 are useful in connecting the heating element 142 to the top housing 136 or a suitable frame disposed within the top housing 136. Suitably, a first insulator 192 is sandwiched between the first end cap 188 and the tube 174, and a second insulator 194 is sandwiched between the second end cap 190 and the tube 174. The insulators 192, 194 facilitate insulating the end caps 188, 190 against conductive heat transfer from the tube 174 to the end caps 188, 190 when the heating element 142 is energized by passing electrical current through the filament 182 via the electrical leads 184, 186.

In the illustrated embodiment, the end caps 188, 190 are fabricated from a ceramic material, and the filament 182 is fabricated from a tungsten material or nickel-chromium-iron composite material. Moreover, the filament 182 is a coiled wire in the illustrated embodiment, with the diameter of each coil and the number of coils being selectable to suit a desired wattage of the heating element 142 and to suit a desired amount of infrared energy emitted from the heating element 142 when the heating element 142 is energized. In that regard, the tube 174 is fabricated from a quartz glass material that may be transparent, translucent (e.g., frosted), or at least partially coated with a reflective material (e.g., a metallic material) to suit a desired amount (and direction) of infrared energy transmitted through the tube 174. Notably, in other embodiments, the heating element 142 may be configured in any suitable manner that facilitates enabling the heating element 142 to function as described herein (e.g., the filament 182 of the heating element 142 may not be coiled in some embodiments, or in other embodiments the tube 174 may not extend linearly but, rather, may extend along a curvilinear path).

Moreover, the space surrounding the filament 182 within the tube 174 is open (i.e., the inside of the tube 174 is either under vacuum with gas, or not sealed and exposed to the ambient air). As such, infrared energy emitted from the energized filament 182 is permitted to travel from the filament 182 through the tube 174 with minimal obstruction in some embodiments). Such a configuration of the heating element 142 is distinguishable from a calrod-type configuration in which a filament is surrounded by a powdered material and packed within a metal tube such that infrared energy emitted from the filament is obstructed and absorbed by the powdered material in order to heat the metal tube via conduction.

As such, the quartz-type heating element 142 disclosed herein provides heating properties that are superior to a calrod-type heating element. For example, the quartz-type heating element 142 emits more infrared energy in a more focused manner to facilitate quicker heat-up and better control of energy incidence onto the top grill plate 144 or the food product (e.g., to enable rapid cycling of the amount of infrared energy incidence onto the top grill plate 144 or the food product such as, for example, at the end of a cooking cycle to perform a final sear operation on the food product). As such, the quartz-type heating element 142 disclosed herein permits the grill 100 to be used in a plurality of alternate configurations to heating a food product in a ways that would not be effective (or practical) via a calrod-type heating element (e.g., broiling a food product using the top grill unit 104 as set forth below would not be effective or practical using a calrod-type heating element). Notably, in alternative embodiments of the grill 100, the heating element(s) 142 may be any suitable type of heating element other than a quartz-type heating element, such as, for example, a ceramic-type heating element, a halogen-type heating element, a calrod-type heating element, etc.

Moreover, the heating element 142 may emit infrared energy unevenly along its length C (e.g., the heating element 142 may emit more infrared energy near its center than near its end caps 188, 190). In that regard, the guard 140 of the top grill unit 104 may be suitably configured as a heat distribution member (or grating) for use when the top grill plate 144 of the top grill unit 104 is removed during a broiling operation of the top grill unit 104, as set forth in more detail below. Notably, the guard 140 may be fabricated from any suitable material (e.g., a metallic material, or a glass (or other transparent or translucent) material. Alternatively, the top grill unit 104 may not include the guard 140. As used herein, the term "heat distribution member" is intended to broadly refer to any structure that facilitates changing (e.g., diffracting, deflecting, and/or reflecting) the direction of at least some energy emitted from the heating element 142 over the food product.

When configured as a heat distribution member, the guard 140 would have its apertures optimized to more evenly distribute infrared energy incidence from the heating element 142 of the top grill unit 104 over the food product during broiling. Suitably, the guard 140 may be mounted in any manner and may be fabricated in any shape (using any material) that facilitates enabling the guard 140 to prevent a food product from contacting the heating element 142, and/or to function as a heat distribution member. Notably, another potential solution for mitigating the uneven emittance of the heating element 142 is to provide a higher density of coils near the end caps 188, 190 than near the center of the heating element 142. This could be done in conjunction with, or in lieu of, the guard 140 being configured as a heat distribution member.

Figure 8:
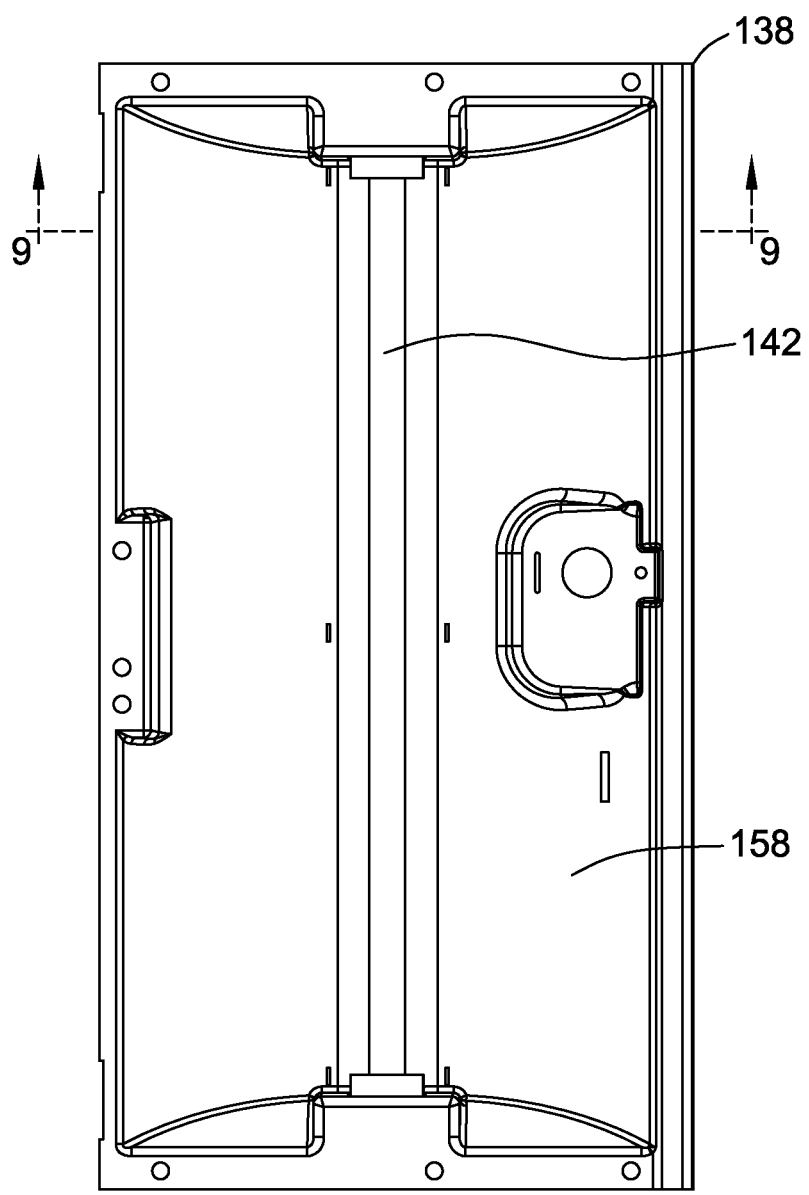
FIG. 8 is an elevation view of a reflector of the top grill unit of FIG. 4.
Figure 9:
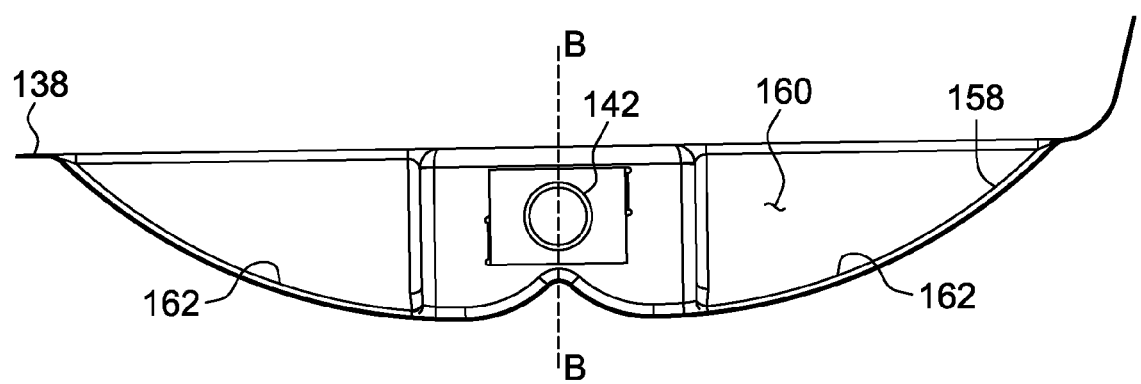
FIG. 9 is a cross-sectional view of the reflector of FIG. 8 taken along plane 9-9.
Figure 10:
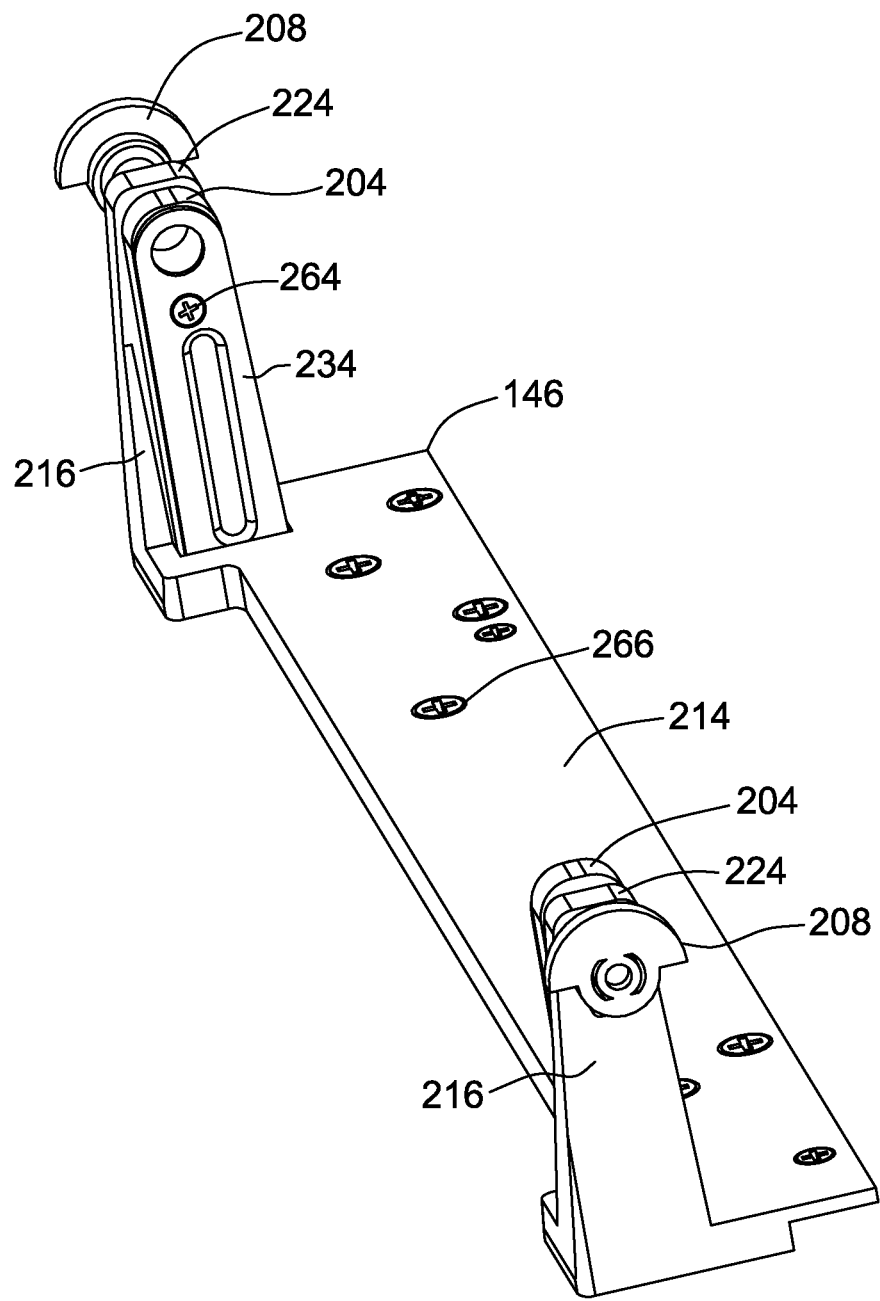
FIG. 10 is a perspective view of a hinge segment of the top grill unit of FIG. 4.

With reference now to FIGS. 8 and 9, the illustrated reflector 138 has a generally rectangular planform shape, and a concave upper surface 158 that defines a trough 160 sized to receive the heating element 142 such that the trough 160 extends along a path that mirrors the path along which the heating element 142 extends.

Figure 22:
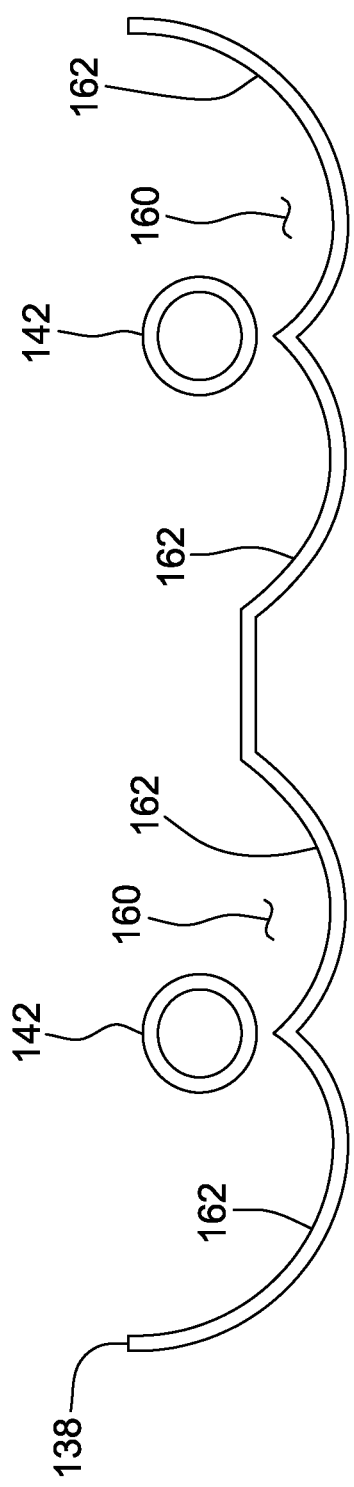
FIG. 22 is a schematic cross-sectional view of another embodiment of the reflector of FIG. 8 with a pair of the heating elements of FIG. 7 mounted in spaced relation thereto.

In the illustrated embodiment of the reflector 138, the trough 160 has a contour (or profile) that is substantially W-shaped. In this manner, the trough 160 defines a pair of side-by-side depressions 162, with the heating element 142 spaced apart from the reflector 138 at the intersection of the depressions 162. Each depression 162 extends along the entire length of the reflector 138, and the depressions 162 intersect one another at an axis B such that the trough 160 is substantially symmetric about the axis B. In another embodiment, illustrated in FIG. 22, the reflector 138 is contoured to define a pair of substantially W-shaped troughs 160 that are side-by-side. Each trough 160 is sized to receive a respective heating element 142, and each trough 160 extends along a path that mirrors the path along which its associated heating element 142 extends. Such a dual-trough reflector 138 may be useful, for example, on larger grills that utilize a pair of heating elements 142 in the top grill unit 104.

Alternatively, the upper surface 158 may define any suitable number of troughs 160 having any suitable number of depressions 162 arranged in any suitable manner. Moreover, the reflector 138 may be formed from a plurality of smaller reflectors that are connected together as an assembly (or are disconnected and arranged adjacent to one another) to perform the functions described herein, rather than being a single, integrally formed reflector as illustrated. Moreover, the reflector 138 may be suitably fabricated from an aluminum material (e.g., a suitable metal substrate coated in aluminum). Alternatively, the reflector 138 may be fabricated from any suitable material that enables the reflector 138 to function as described herein (e.g., a metal substrate coated in a zinc material such as galvanized steel).

During operation of the grill 100, the heating element 142 is energized (by passing current through the filament 182 via the electrical leads 184, 186), and infrared energy is emitted from the filament 182, and the infrared energy passes through the tube 174 with minimal obstruction. When the top grill plate 144 is mounted on the top housing 136, the infrared energy emitted from the upper region of the heating element 142 has a direct path to impacting an underside of the top grill plate 144. Moreover, the infrared energy emitted from the lower region of the heating element 142 has an indirect path to the top grill plate 144 by reflecting off of the upper surface 158 of the reflector 138 within the trough 160. More specifically, the depressions 162 reflect the infrared energy from the heating element 142 toward the underside of the top grill plate 144 in a direction that is substantially parallel to the axis B.

Referring now to FIGS. 10-13, the top half 146 of the hinge 106 includes a chassis 202, a pair of spacers 204, and a pair of brackets 206. The top half 146 of the hinge 106 further includes a pair of pins 208, and a pair of pin biasing elements 210. In alternative embodiments, the top half 146 of the hinge 106 may have any suitable components that facilitate enabling the hinge 106 to function as described herein.

The illustrated chassis 202 has a main panel 214 and a pair of top leaves 216. The main panel 214 has a pair of windows 218, and each window 218 is disposed adjacent to, and inward of, a respective one of the top leaves 216. The main panel 214 also has a pair of channels 220, with each channel 220 being oriented substantially perpendicular to a respective one of the windows 218 such that the each channel 220 overlaps its corresponding window 218 to together form a substantially L-shaped inset in the main panel 214. Each top leaf 216 has an oblong passage 222 near its distal end 224, and the main panel 214 has a plurality of fastener apertures 226 for fastening the chassis 202 to the top housing 136. Notably, a pair 228 of the fastener apertures 226 extends through each of the channels 220 of the main panel 214.

Each bracket 206 has a guide arm 230 and a connector arm 232 that are generally coplanar and are oriented substantially perpendicular to one another in a generally L-shaped manner. The bracket 206 also has as a drive arm 234 that extends from the connector arm 232 in a plane that is substantially perpendicular to the plane shared by the guide arm 230 and the connector arm 232. The guide arm 230 has a pair of elongate guide holes 236, and the drive arm 234 has a fastener hole 238 and a pin hole 240 arranged in spaced relation to one another. Moreover, each spacer 204 has a fastener hole 242 and a pin hole 244 that are spaced apart in the same manner as the fastener hole 238 and the pin hole 240 of the drive arm 234 so as to be aligned with the fastener hole 238 and the pin hole 240 of the drive arm 234 when each spacer 204 is fastened to its associated bracket 206, as set forth in more detail below.

Each pin 208 has a head 246, a dial 248, and a neck 250 connecting the head 246 to the dial 248. Notably, the neck 250 is more slender than the head 246 and the dial 248, and the neck 250 has a rounded segment 252 and a keyed (or flattened) segment 254. The head 246 is generally conical, and the dial 248 has a base 256 and a substantially semi-annular disc 258 extending from the base 256. The disc 258 defines a first face 260 and a second face 262 that are angularly spaced from one another by about 180°. In other embodiments, however, the faces 260, 262 of the disc 258 may be spaced apart from one another at any suitable angle.

In its assembled configuration, the top half 146 of the hinge 106 has the spacers 204 fastened to their respective drive arms 234 using fasteners 264 inserted into the associated fastener holes 238, 242 such that the pin holes 240, 244 are substantially aligned with one another. Moreover, the brackets 206 are mounted on the main panel 214 such that each guide arm 230 is situated in a respective one of the channels 220, with each connector arm 232 at least partially spanning a respective one of the windows 218 such that the drive arms 234 extend through the windows 218 to align the pin hole 244 of each spacer 204 with the passage 222 of each respective top leaf 216 of the chassis 202.

Additionally, each pin 208 extends through the passage 222 of its associated top leaf 216 such that the head 246 of each pin 208 is disposed between its corresponding spacer 204 and top leaf 216, with the pin biasing element 210 circumscribing the neck 250 between the top leaf 216 and the spacer 204 such that the dial 248 is outward of the top leaf 216 and the head 246 is inward of the top leaf 216. In this manner, the keyed segment 254 of the neck 250 is inserted into the oblong passage 222 of the top leaf 216 to facilitate preventing the pin 208 from rotating relative to the top leaf 216. Moreover, the conical head 246 of the pin 208 extends at least partially into the pin hole 244 of the spacer 204.

The chassis 202 is fastened to the top housing 136 using a plurality of fasteners 266 inserted through the fastener apertures 226 of the main panel 214 such that a pair of the fasteners 266 extends through the pair 228 of fastener apertures 226 associated with the channels 220 of the main panel 214 so as to pass through the guide holes 236 of the guide arm 230 of the bracket 206. In this manner, the guide arm 230 of the bracket 206 is slidable along its respective channel 220 of the main panel 214 such that the pair of fasteners 266 guides the direction of bracket's sliding movement and limits the inward/outward displacement of the bracket 206. Moreover, due to the channels 220 being inset, the main panel 214 and the top housing 136 together define a slit 270 (shown in FIGS. 6, 16, and 18) providing access to each guide arm 230 for displacing the guide arm 230 outward using, for example, the wedges 154 of the top grill plate 144 as set forth in more detail below.

Because the pin biasing element 210 is disposed between the top leaf 216 of the chassis 202 and the head 246 of the pin 208, the head 246 of the pin 208 is biased away from the top leaf 216. As such, the spacer 204 is also biased away from the top leaf 216, and the guide arm 230 of the bracket 206 is thereby biased inward within its respective channel 220. Optionally, each of the brackets 206 may also be connected to the main panel 214 via a bracket biasing element 268 (shown in FIGS. 11 and 12) that assists to bias the guide arms 230 of the brackets 206 inward within the channels 220.

In this manner, the dial 248 of each pin 208 is biased toward its corresponding top leaf 216. Thus, as set forth in more detail below, when the guide arms 230 of the brackets 206 are displaced outward within the channels 220, the guide arms 230 displace the drive arms 234 toward the top leaves 216 such that the drive arms 234 drive the heads 246 of their corresponding pins 208 toward their corresponding top leaves 216 via the spacers 204. The dials 248 of the pins 208 are thereby driven outward away from the top leaves 216. As such, the pins 208 are biased inward by the pin biasing elements 210, and the pins 208 can be driven outward (against such bias) by displacing the guide arms 230 outward.

Figure 14:
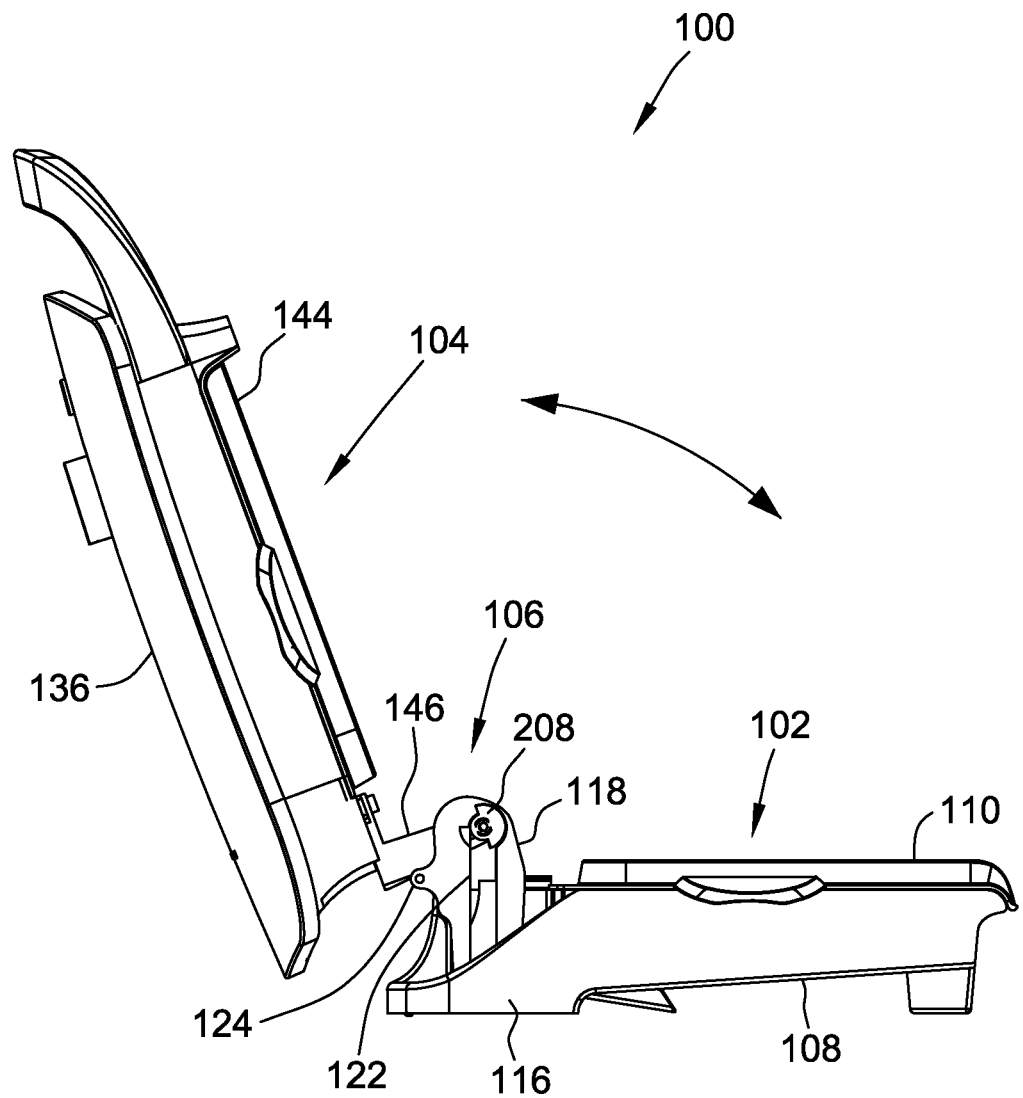
FIG. 14 is a side view of the tabletop grill of FIG. 1 in an open configuration.
Figure 15:
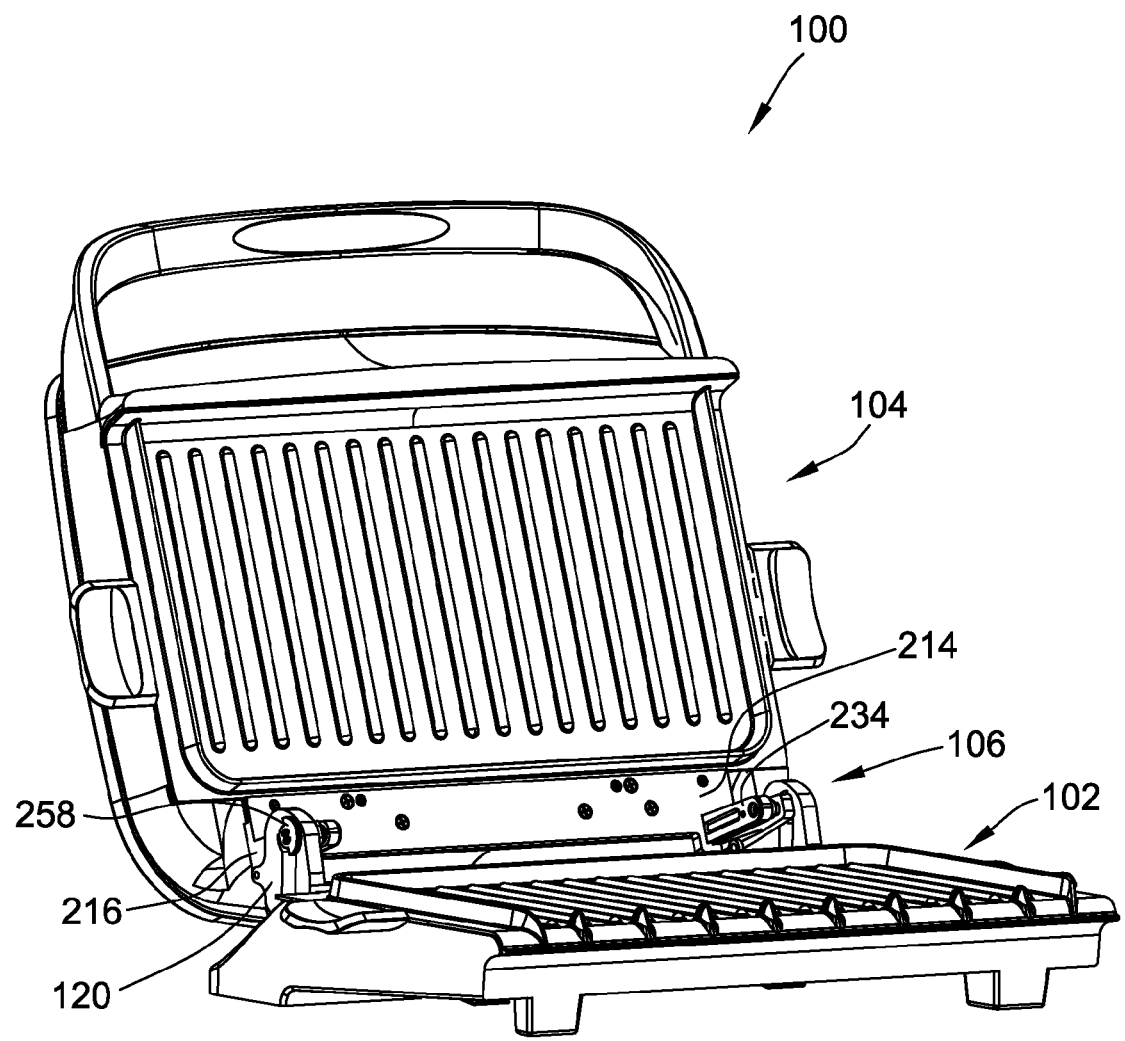
FIG. 15 is a perspective view of the tabletop grill of FIG. 1 in the open configuration of FIG. 14.
Figure 16:
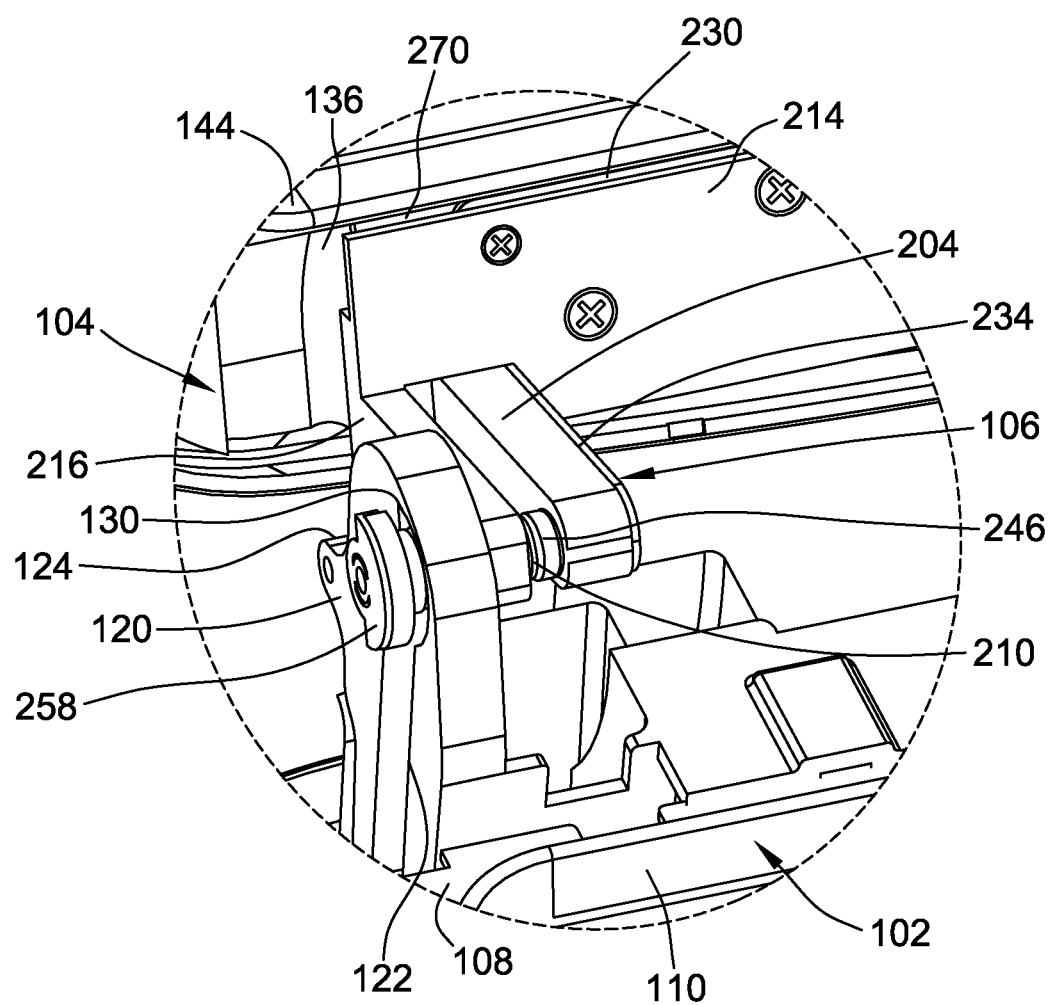
FIG. 16 is an enlarged perspective view of a portion of the tabletop grill of FIG. 1 in the open configuration of FIG. 14.

FIGS. 14-16 illustrate the top grill unit 104 pivotably attached to the bottom grill unit 102 via the hinge 106. Specifically, the top half 146 of the hinge 106 is connected to the bottom half 118 of the hinge 106 such that each pin 208 is inserted through one of the slots 122 of one of the bottom leaves 120. Each pin 208 further extends through the passage 222 of its corresponding top leaf 216, and its associated pin biasing element 210. In this manner, each bottom leaf 120 is sandwiched between one of the discs 258 and one of the top leaves 216 to retain the bottom leaves 120 on the pins 208.

Because the keyed segments 254 of the pins 208 are inserted into the oblong passages 222 of the associated top leaves 216, any pivoting movement (i.e., opening or closing) of the top grill unit 104 relative to the bottom grill unit 102 causes the pins 208 to rotate within their respective slots 122. In this manner, as the top grill unit 104 is pivoted open from its fully closed position (illustrated in FIG. 1), the top leaves 216 contact, and pivot about, the fulcrum structures 124 to drive the pins 208 to the upper ends 128 of their respective slots 122. Upon the pins 208 reaching the upper ends 128 of the slots 122, the top grill unit 104 cannot be pivoted any further, and the top grill unit 104 is considered to be fully opened (as illustrated in FIGS. 14-16).

Notably, because the top grill plate 144 is attached to the top housing 136, the wedges 154 (illustrated in FIG. 5) are inserted into the slits 270, pushing the guide arms 230 outward in their respective channels 220 against the force of the pin biasing elements 210 (and optionally the force of the bracket biasing elements 268). The pins 208 are thereby pushed outward such that, as the top grill unit 104 is displaced (i.e., raised and lowered, or pivoted open and closed), the discs 258 do not enter the recesses 130 when the pins 208 are at the upper ends 128 of the slots 122. Thus, when the top grill plate 144 is attached, the top grill unit 104 enjoys its full range of vertical motion (i.e., any desired vertical displacement of the pins 208 between the lower ends 126 and the upper ends 128 of the slots 122) and its full range of pivoting motion (i.e., any desired angular displacement of the top grill plate 144 from the bottom grill plate 110 such as, for example, within a 105° range of pivot).

Figure 17:
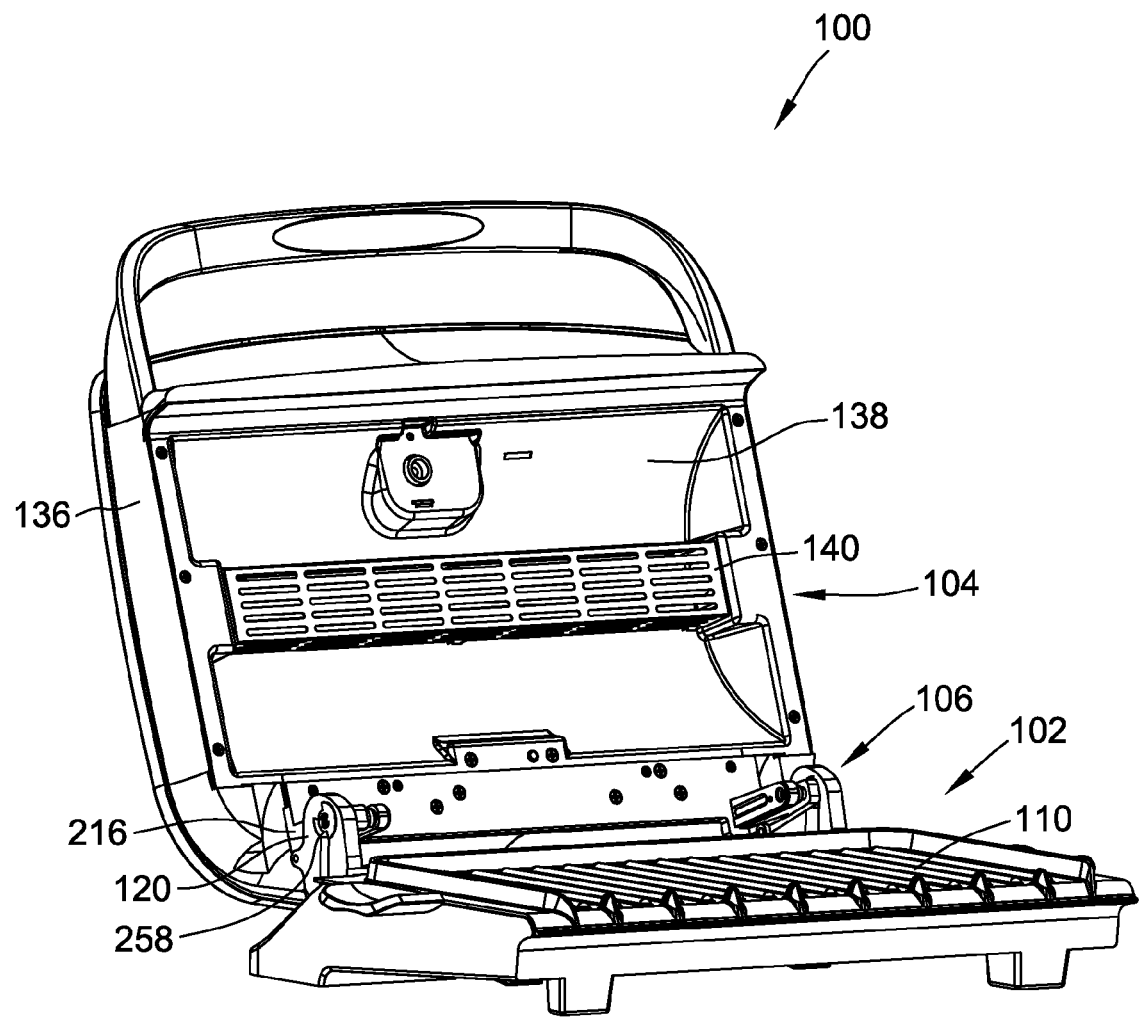
FIG. 17 is a perspective view of the tabletop grill of FIG. 1 in the open configuration of FIG. 14 with the grill plate of the top grill unit removed.
Figure 18:
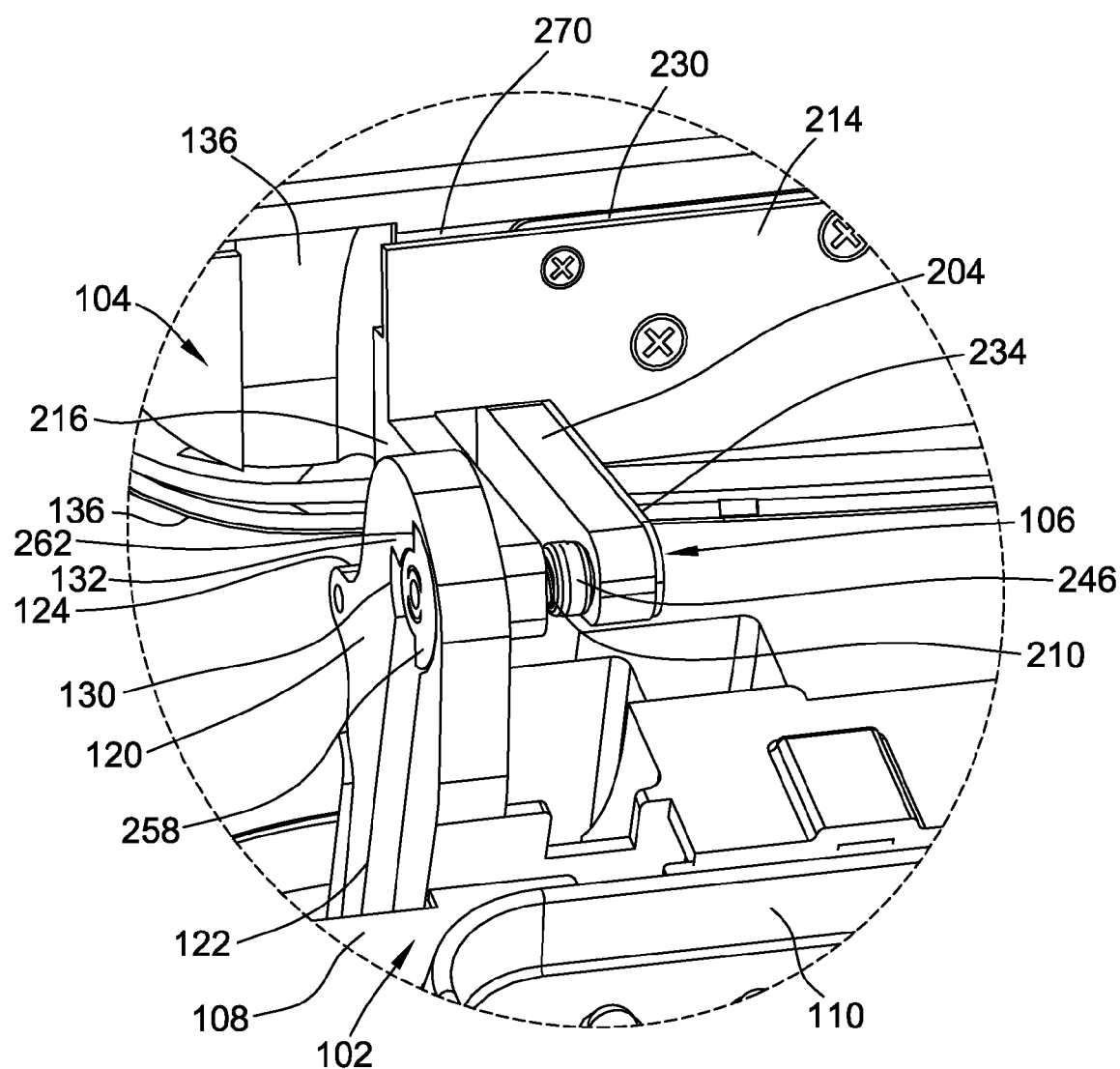
FIG. 18 is an enlarged perspective view of a portion of the tabletop grill of FIG. 1 in the open configuration of FIG. 14 with the grill plate of the top grill unit removed.

With reference now to FIGS. 17 and 18, if the top grill plate 144 is removed from the top housing 136, the wedges 154 are withdrawn from the slits 270. Thus, the guide arms 230 are no longer held outward by the wedges 154, and the pin biasing elements 210 are permitted to somewhat decompress. Specifically, the pin biasing elements 210 bias the pins 208 inward by pushing the heads 246 inward, which in turn pushes the spacers 204 and brackets 206 inward. As such, when the top grill plate 144 has been removed and the pins 208 are disposed at the upper ends 128 of the slots 122, the discs 258 retract inward into the recesses 130 of the bottom leaves 120. In such a position, the discs 258 inhibit the pins 208 from lowering within the slots 122 and limit the pivoting range of the top grill unit 104. Again, the bracket biasing elements 268 (illustrated in FIGS. 11 and 12) may optionally be utilized to pull the brackets 206 inward after the top grill plate 144 has been removed, thereby assisting the pin biasing elements 210 in pushing the pins 208 inward.

Figure 19:
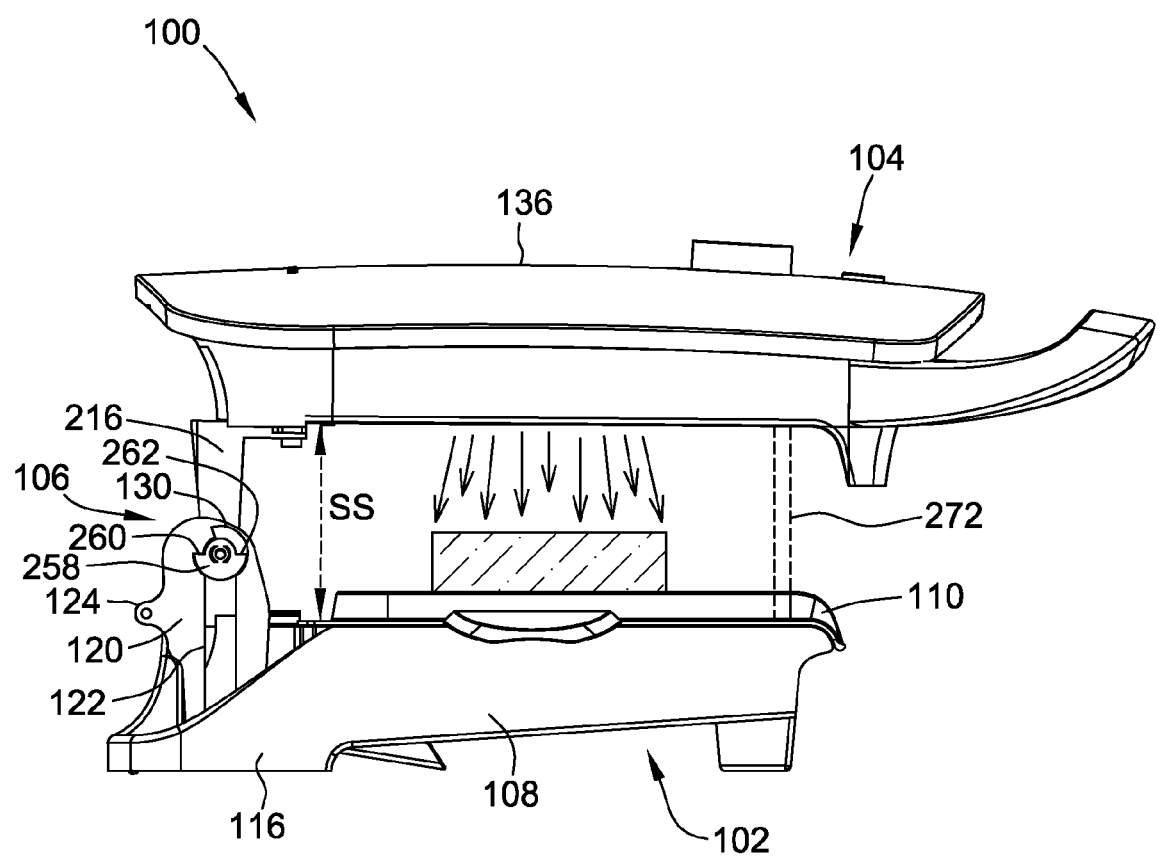
FIG. 19 is a side view of the tabletop grill of FIG. 1 in a closed configuration with the grill plate of the top grill unit removed.
Figure 20:
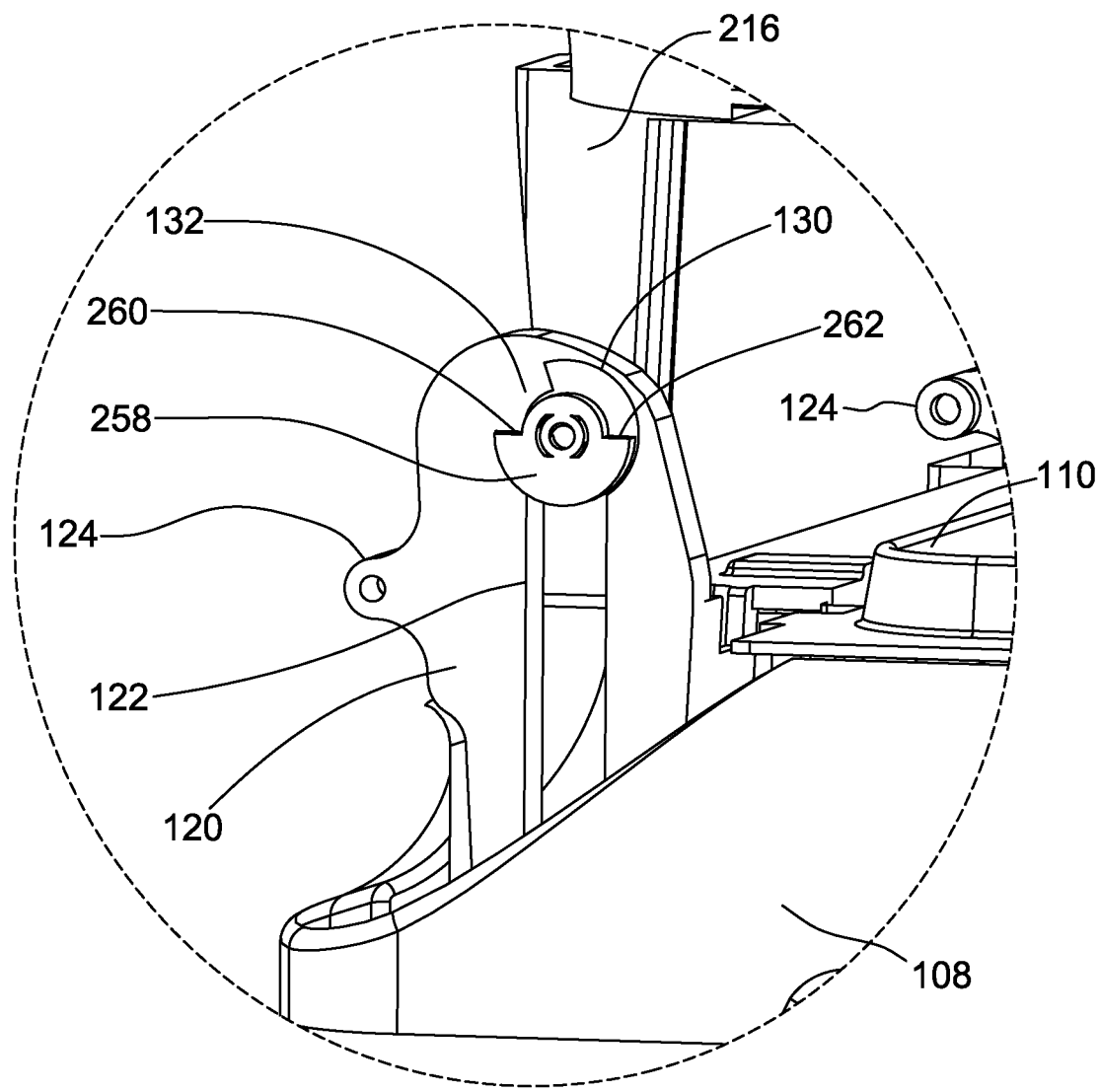
FIG. 20 is an enlarged perspective view of the tabletop grill of FIG. 1 in the closed configuration of FIG. 19.

As illustrated in FIGS. 19 and 20, if the top grill unit 104 is pivoted closed after the top grill plate 144 has been removed and the pins 208 have been retracted inward such that the discs 258 are in the recesses 130, the discs 258 rotate within the recesses 130 until one of the faces 260, 262 of each disc 258 contacts its associated stopper 132 to halt the pivoting movement of the top grill unit 104. Specifically, the hinge 106 permits the top housing 136 to be closed only to a point at which the reflector 138, the guard 140, and the heating element 142 are suspended above the bottom grill plate 110 and, therefore, above a food product disposed on the bottom grill plate 110.

In such a position, the grill 100 is able to perform a broiling function using the top grill unit 104. Specifically, with the top grill plate 144 removed, the infrared energy emitted by the heating element 142 of the top grill unit 104 is minimally obstructed in its path to the food product disposed on the bottom grill plate 110. The corresponding incidence of infrared energy over the food product thereby broils the food product.

Moreover, in some embodiments, the grill 100 may be provided with a retractable prop 272 (e.g., a foldable or a telescoping prop) stowed within the top grill unit 104 or the bottom grill unit 102. The prop 272 is extendable between the top grill unit 104 and the bottom grill unit 102 during broiling to facilitate supporting the top grill unit 104 in substantially parallel, spaced relation with the bottom grill unit 102 (i.e., to facilitate assisting the hinge 106 in supporting the weight of the top grill unit 104 during broiling). Optionally, the heating element 142 of the bottom grill unit 102 may or may not be energized during broiling, such that the food product may or may not be heated from underneath by the bottom grill unit 102 during broiling.

After broiling the food product, the top grill unit 104 can again be pivoted open such that the discs 258 rotate in the opposite direction within the recesses 130 until the other faces 260, 262 of the discs 258 contact the associated stopper 132. In such a position, the top leaves 216 would again be at rest on the fulcrum structures 124, at which point the top plate 144 can again be mounted on the top housing 136. Specifically, the wedges 154 can be reinserted into the slits 270 to again displace the guide arms 230 outward, compressing the pin biasing elements 210 and pushing the discs 258 out of the recesses 130. As such, the top grill unit 104 would again enjoy its full range of vertical motion (i.e., any desired vertical displacement of the pins 208 between the lower ends 126 and the upper ends 128 of the slots 122) and its full range of pivoting motion (i.e., any desired angular displacement of the top grill plate 144 from the bottom grill plate 110). Notably, many other embodiments of the hinge 106 are contemplated, enabling any desired relative positioning of the grill units 102, 104 (and, therefore, any desired orientation of the associated grill plates 110, 144 relative to one another).

Moreover, in one embodiment, only the top grill unit 104 (not the bottom grill unit 102) is provided with the quartz-type heating element 142 described herein, or vice versa. In another embodiment, rather than using the reflector 138 described above, each heating element 142 may be provided with a reflective coating (e.g., a gold coating) on its region of the tube 174 that faces away from the food product (as set forth above) to reflect infrared energy emitted from the filament 182 toward the food product. In other embodiments, the heating element(s) 142 could be mounted behind a transparent or translucent glass plate (much like the headlight of an automobile).

In some embodiments, the underside of at least one grill plate 110, 144 may be coated in a heat absorbing material (e.g., a black paint) to facilitate absorbing the infrared energy and more evenly spreading the associated heat along the grill plate 110, 144 to provide for more uniform heating of the food product contacting the grill plate 110, 144. Optionally, in one embodiment, the underside of at least one grill plate 110, 144 may be unevenly contoured such that the angle of light absorption would be optimized for a more uniform spreading of heat over the grill plate 110, 144 given that, if the underside is made flat, it may get hotter in the middle and cooler at the periphery. Moreover, in another embodiment, at least one grill plate 110, 144 may be fabricated from a transparent or translucent material (e.g., a glass material), enabling the infrared energy emitted by the heating element 142 to pass through the grill plate 110, 144, rather than being absorbed by the grill plate 110, 144 (e.g., the broiling operation described above could then be performed with the top grill plate 144 attached to the top housing 136).

Figure 21:
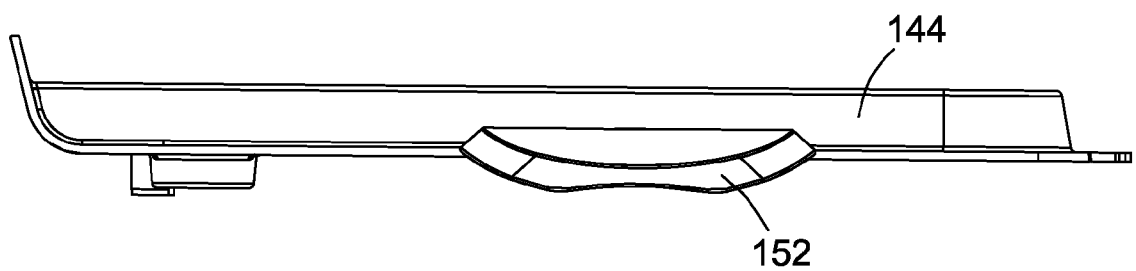
FIG. 21 is a side view of the grill plate of the top grill unit of FIG. 4.

Optionally, as illustrated in FIG. 21, the top grill plate 144 (and/or the bottom grill plate 110) may be provided with cool-touch handles 152 that are sized such that, when the top grill plate 144 has been removed from the top housing 136 for broiling, the top grill plate 144 (which may be hot) can be placed on a support surface (such as a countertop) in a manner that only the handles 152 contact the support surface, thereby inhibiting the top grill plate 144 from heating the support surface when not in use.

In some embodiments, the grill 100 may be configured with an electrical switch that stops the flow of electrical current to the heating element 142 of the top grill unit 104 if the top grill plate 144 has been removed and the top grill unit 104 is pivoted open. Moreover, the grill 100 may be suitably configured to selectively modulate electrical current to the various heating elements 142 depending upon a user-selected mode of operation (e.g., the grill 100 may be configured to provide full power to the heating element 142 of the top grill unit 104 when the top grill plate 144 has been removed and the top grill unit 104 is in its broiling position, as opposed to providing less than full power to the heating element 142 of the top grill unit 104 in other instances).

Figure 23:
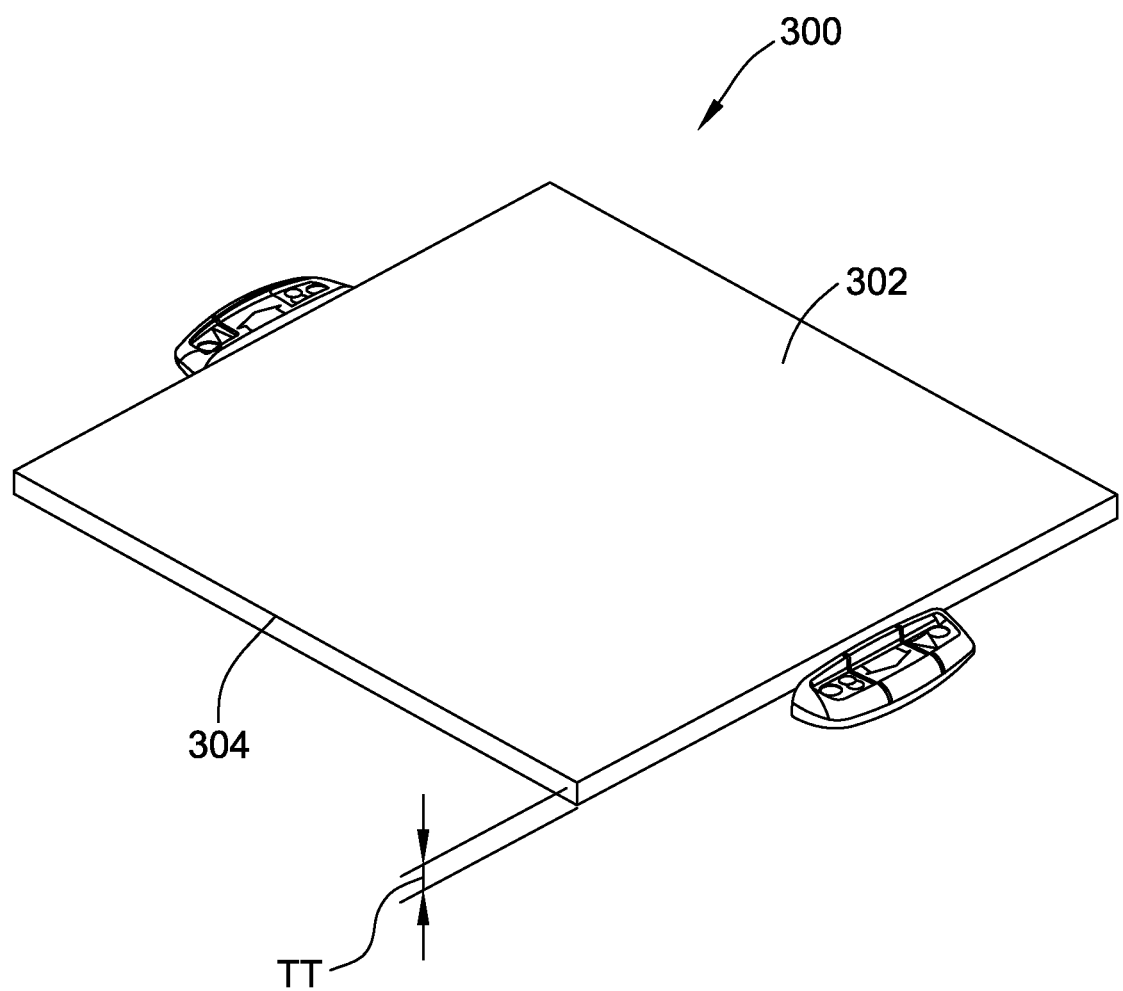
FIG. 23 is a perspective view of another embodiment of a grill plate of the tabletop grill of FIG. 1.

In other embodiments, when the top grill plate 144 is removed from the top housing 136, the bottom grill plate 110 of the bottom grill unit 102 may be replaced with a flat grill plate (or "pizza stone" 300 as illustrated in FIG. 23) that is more suitable for heating a pizza when the grill 100 is in the broiling mode described above. The illustrated pizza stone 300 is fabricated from a ceramic material (i.e., an inorganic, nonmetallic solid having a crystalline or semi-crystalline structure formed through heating and cooling processes). Moreover, the pizza stone 300 has a flat top surface 302 (on which a pizza is to be placed) and a uniform thickness TT spanning the perimeter of the top surface 302.

Figure 24:
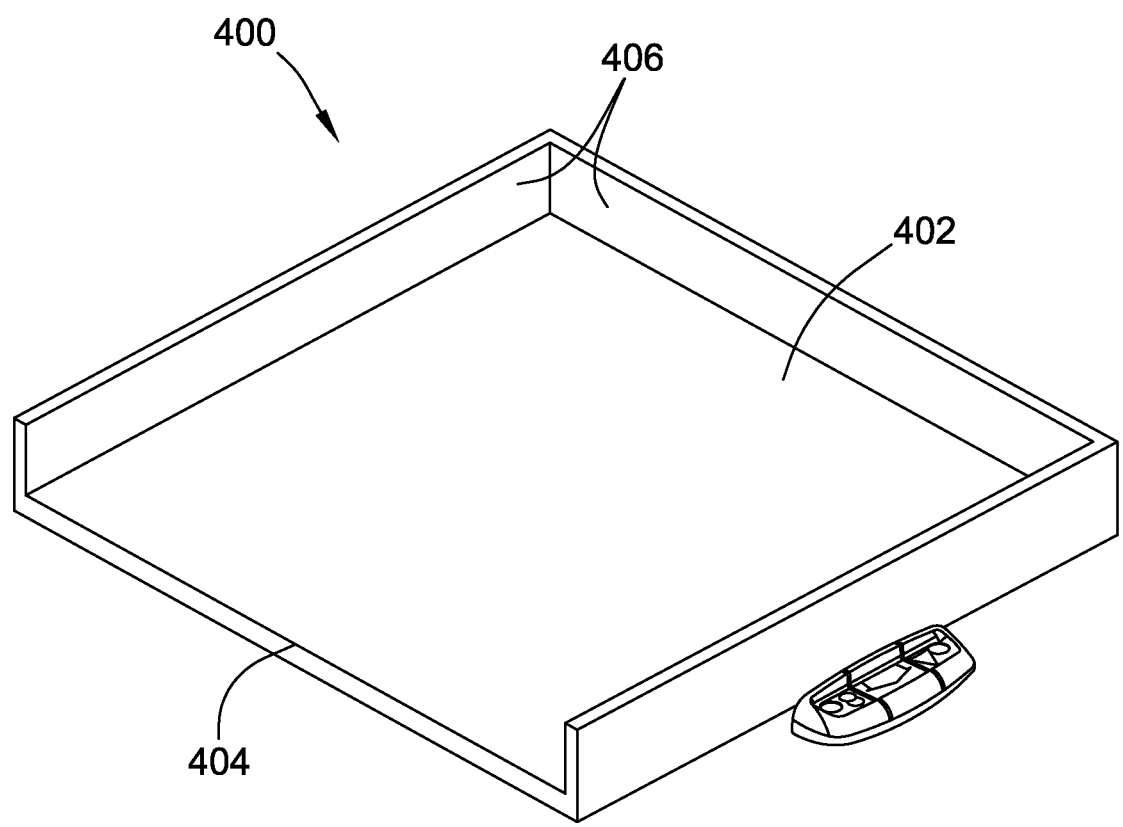
FIG. 24 is a perspective view of yet another embodiment of a grill plate of the tabletop grill of FIG. 1.

When compared to metallic grill plates, the ceramic material of the pizza stone 300 provides thermal emittance benefits and thermal capacitance benefits (e.g., heat distribution benefits due, at least in part, to its increased thermal mass and infrared energy (IR) emitting properties, etc.), as well as providing moisture absorption benefits. Thus, the embodiments of the grill 100 described herein in combination with the pizza stone 300 and, optionally, the quartz-type heating element(s) 142, provides superior functionality when heating a food product such as a pizza. Optionally, as shown in FIG. 24, another pizza stone embodiment 400 may have integrally formed, vertically extending sidewalls 406 configured to at least partially surround the pizza and substantially enclose an intermediate space SS (illustrated in FIG. 19) between the grill units 102, 104, thereby effectuating the functionality of a brick-oven-style heating operation.

Because the illustrated top surfaces 302, 402 of the pizza stones 300, 400 are entirely flat (i.e., do not have ribs or other protrusions typically associated with grill plates for use in heating meat), the top surfaces 302, 402 do not have protrusions that would inhibit the entire underside of a pizza from remaining in contact with the top surfaces 302, 402 of the pizza stones 300, 400 during heating. Moreover, the illustrated top surfaces 302, 402 also do not have protrusions near their front edges 304, 404, which enables a pizza to be slid onto the pizza stones 300, 400 without having to pivot the top grill unit 104 open from its broiling position illustrated in FIG. 19.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A tabletop grill comprising:
   a first grill unit comprising a first grill plate;
   a second grill unit positionable relative to the first grill unit, the second grill unit comprising:
      a housing defining an interior space;
      a second grill plate removably mounted on the housing to cover the interior space;
      a heating element mounted within the interior space; and
   a hinge comprising a first hinge element provided to the first grill unit, a second hinge element provided to the second grill unit, and a hinge pin operatively connecting the first hinge element and the second hinge element, the hinge further comprising a guide arm that is slidably operatively connected with the second hinge element to be movable in response to removal or connection of the second grill plate to the housing, the second grill plate including an activation element for causing movement of the guide arm in at least one direction, the guide arm also being operatively connected to the hinge pin to shift the hinge pin in the at least one direction to a first position so as to allow pivotal movement and vertical movement of the second hinge element to the first hinge element,
   wherein the hinge pin is also movable from the first position to a second position to limit the range of pivoting motion of the second grill unit relative to the first grill unit when the second grill plate is removed from the housing.

2. The tabletop grill of claim 1, wherein the heating element comprises a tube and a filament disposed within the tube such that open space surrounds the filament within the tube, the tube being one of transparent and translucent.

3. The tabletop grill of claim 1, wherein the grill comprises a heat distribution member disposed within the interior space of the housing to facilitate evenly distributing energy emitted from the heating element.

4. The tabletop grill of claim 3, wherein the heat distribution member is a grating.

5. The tabletop grill of claim 1, wherein the second grill unit is configured for vertical displacement relative to the first grill unit to vary spacing between the grill units.

6. The tabletop grill of claim 1, wherein the second grill unit comprises a reflector configured to direct energy emitted from the heating element toward the second grill plate.

7. The tabletop grill of claim 6, wherein the reflector has an upper surface that is contoured to define a trough sized to receive the heating element.

8. The tabletop grill of claim 7, wherein the trough has a pair of side-by-side depressions that extend along the length of the heating element.

9. The tabletop grill of claim 8, wherein the heating element is disposed between the depressions.

10. The tabletop grill of claim 1, wherein the heating element is substantially linearly extending.

11. The tabletop grill of claim 10, wherein the heating element substantially spans the interior space.

12. The tabletop grill of claim 1, wherein the grill plate has an underside that is coated in a heat absorbing material.

13. The tabletop grill of claim 12, wherein the heat absorbing material is a black paint.

14. The tabletop grill of claim 1, wherein the grill plate is one of transparent and translucent.

* * * * *